US012310538B2

(12) United States Patent
Kaye et al.

(10) Patent No.: US 12,310,538 B2
(45) Date of Patent: May 27, 2025

(54) CLEANING SYSTEM WITH DISSOLVABLE CLEANER BLOCK AND HANDLING TOOL FOR THE SAME

(71) Applicant: Henkel AG & Co. KGaA, Duesseldorf (DE)

(72) Inventors: Glenn William Kaye, Norwalk, CT (US); Daniel Thomas Piorkowski, Fairfield, CT (US); Christopher Michael Rodriguez, Brewster, NY (US); Luis Ramiro Gutierrez Montenegro, Stamford, CT (US); John Kevin Clay, Milford, CT (US); Peter Brian Clarke, Newtown, CT (US); Rodrigo Mena-Brito, New Providence, NJ (US); Jonathan Domingues Afonso, New Providence, NJ (US)

(73) Assignee: Henkel AG & Co. KGaA, Duesseldorf (DE)

( * ) Notice: Subject to any disclaimer, the term of this patent is extended or adjusted under 35 U.S.C. 154(b) by 760 days.

(21) Appl. No.: 17/444,029

(22) Filed: Jul. 29, 2021

(65) Prior Publication Data

US 2023/0034253 A1 Feb. 2, 2023

(51) Int. Cl.

| | |
|---|---|
| ***A47K 17/00*** | (2006.01) |
| ***B25G 3/28*** | (2006.01) |
| ***C11D 17/00*** | (2006.01) |

(52) U.S. Cl.
CPC ................ *A47K 17/00* (2013.01); *B25G 3/28* (2013.01); *C11D 17/0056* (2013.01)

(58) Field of Classification Search
CPC ......... A47K 11/10; A47K 17/00; A47L 13/10; C11D 17/0056
See application file for complete search history.

(56) References Cited

U.S. PATENT DOCUMENTS

| | | | |
|---|---|---|---|
| D501,728 | S | 2/2005 | Conway et al. |
| D502,002 | S | 2/2005 | Conway et al. |
| D502,325 | S | 3/2005 | Hennel et al. |
| 7,059,008 | B2 | 1/2006 | Morgan et al. |
| 7,065,825 | B2 | 6/2006 | Minkler et al. |
| 7,127,768 | B2 | 10/2006 | Blum et al. |
| 7,146,676 | B2 | 12/2006 | Kubes et al. |
| 7,159,265 | B2 | 1/2007 | Soller et al. |
| 7,275,276 | B2 | 10/2007 | Jaszenovics et al. |
| 7,316,046 | B2 | 1/2008 | Michaels et al. |
| 7,386,910 | B2 | 6/2008 | Minkler et al. |

(Continued)

*Primary Examiner* — Shay Karls
(74) *Attorney, Agent, or Firm* — Bojuan Deng

(57) ABSTRACT

A cleaning system includes a handling tool for a dissolvable cleaner block. The handling tool includes a wand and a retainer arrangement attached to the wand and moveable between a retaining position and a releasing position. The retainer arrangement is configured for removably attaching the wand to the dissolvable cleaner block when in the retaining position. The retainer arrangement is configured for releasing the dissolvable cleaner block when in the releasing position. The retainer arrangement includes at least one selectively moveable engagement member that removably engages the dissolvable cleaner block in the retaining position. Furthermore, the handling tool includes a sealing member that is attached to the wand and that is configured to seal against the dissolvable cleaner block when engaged with the retainer arrangement to impede liquid intrusion toward the retainer arrangement.

20 Claims, 6 Drawing Sheets

(56) References Cited

U.S. PATENT DOCUMENTS

| | | | |
|---|---|---|---|
| 7,446,082 | B2 | 11/2008 | Kilkenny et al. |
| 7,470,652 | B2 | 12/2008 | Kilkenny et al. |
| D588,365 | S | 3/2009 | Conway et al. |
| 7,603,739 | B2 | 10/2009 | Minkler et al. |
| 7,650,663 | B2 | 1/2010 | Michaels et al. |
| 7,827,648 | B2 | 11/2010 | Soller et al. |
| 8,286,295 | B2 | 10/2012 | Minkler et al. |
| 9,021,649 | B2 | 5/2015 | Minkler et al. |
| 9,370,293 | B2 | 1/2016 | Butts et al. |
| 9,622,638 | B2 | 4/2017 | Butts et al. |

CLEANING SYSTEM WITH DISSOLVABLE CLEANER BLOCK AND HANDLING TOOL FOR THE SAME

FIELD OF THE INVENTION

The following relates to a cleaning system and relates, more particularly, to a cleaning system with a dissolvable cleaner block and a handling tool for the dissolvable cleaner block.

BACKGROUND OF THE INVENTION

Cleaning systems have been proposed for facilitating certain cleaning tasks. For example, toilet bowl cleaning systems have been proposed for cleaning inside a toilet and below the water line. These systems can make the cleaning process easier, more sanitary, etc.

However, conventional cleaning systems suffer from certain deficiencies. Some systems may include a disposable or otherwise nonpermanent cleaning unit. In some cases, the cleaning unit may not be robust enough to properly withstand the cleaning process. More specifically, the water in the toilet, associated cleaning agents, and/or the scouring and scrubbing action may prematurely degrade the cleaning unit such that the system fails to clean the bowl to the user's satisfaction.

Additionally, some cleaning systems may suffer from poor ergonomics. Furthermore, in some cases, the user may need to handle the cleaning unit after it is used (e.g., for disposal); however, this can be unsanitary and unpleasant. Additionally, use of these conventional systems may generate undesirable amounts of waste. Some cleaning units may be flushed after use; however, septic systems may be negatively affected in some cases.

Furthermore, manufacturing of these conventional cleaning systems may be inefficient and costly. These systems often include a large number of parts. Forming parts, assembling the parts, etc. can also be inefficient.

Thus, there exists an ongoing demand for improved cleaning systems, such as toilet bowl cleaning systems, that are highly robust and effective. There is also a need for such cleaning systems to have improved ergonomics for facilitating use. Furthermore, there is a need for these cleaning systems to generate less waste and/or provide other environmental benefits. Moreover, there is a need for these cleaning systems to be manufactured efficiently.

BRIEF SUMMARY OF THE INVENTION

Embodiments of a cleaning system are provided. In various embodiments, the cleaning system includes a handling tool for a dissolvable cleaner block. The handling tool includes a wand and a retainer arrangement attached to the wand and moveable between a retaining position and a releasing position. The retainer arrangement is configured for removably attaching the wand to the dissolvable cleaner block when in the retaining position. The retainer arrangement is configured for releasing the dissolvable cleaner block when in the releasing position. The retainer arrangement includes at least one selectively moveable engagement member that removably engages the dissolvable cleaner block in the retaining position. Furthermore, the handling tool includes a sealing member that is attached to the wand and that is configured to seal against the dissolvable cleaner block when engaged with the retainer arrangement to impede liquid intrusion toward the retainer arrangement.

Embodiments of a cleaning system are further provided. The cleaning system includes a cleaner block that includes an engagement portion. The cleaner block is dissolvable. The cleaning system also includes a handling tool that removably attaches to the cleaner block. The handling tool includes a wand and a retainer arrangement attached to the wand and moveable between a retaining position and a releasing position. The retainer arrangement removably attaches the wand to the engagement portion of the cleaner block when in the retaining position. The retainer arrangement is configured for releasing the cleaner block when in the releasing position. The retainer arrangement includes at least one selectively moveable engagement member that removably engages the engagement portion of the cleaner block in the retaining position. Furthermore, the handling tool includes a sealing member that is attached to the wand and sealed against the dissolvable cleaner block when engaged with the retainer arrangement to impede liquid intrusion toward the retainer arrangement.

Methods for manufacturing a cleaning system are further provided. In some embodiments, the method includes attaching a retainer arrangement to a wand such that the retainer arrangement is moveable between a retaining position and a releasing position. The retainer arrangement is configured for removably attaching the wand to a dissolvable cleaner block when in the retaining position. The retainer arrangement is configured for releasing the dissolvable cleaner block when in the releasing position. The retainer arrangement includes at least one selectively moveable engagement member that removably engages the dissolvable cleaner block in the retaining position. The method additionally includes attaching a sealing member to the wand such that the sealing member is configured to seal against the dissolvable cleaner block when engaged with the retainer arrangement to impede liquid intrusion toward the retainer arrangement.

The foregoing statements are provided by way of non-limiting example only. Various additional examples, aspects, and other features of embodiments of the present disclosure are encompassed by the present disclosure and described in more detail below.

BRIEF DESCRIPTION OF THE DRAWINGS

At least one example of the present disclosure will hereinafter be described in conjunction with the following figures, wherein like numerals denote like elements, and.

Figure 1:
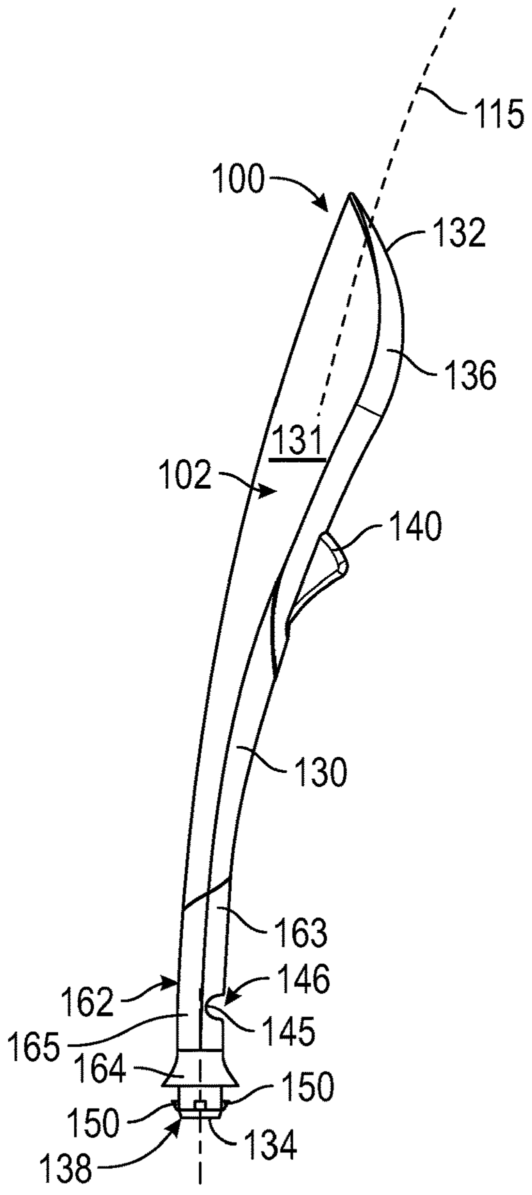
FIG. 1 is a side view of a handling tool of a cleaning system shown in a first position according to example embodiments of the present disclosure.

For simplicity and clarity of illustration, descriptions and details of well-known features and techniques may be omitted to avoid unnecessarily obscuring the exemplary and non-limiting embodiments of the present disclosure described in the subsequent Detailed Description. It should further be understood that features or elements appearing in the accompanying figures are not necessarily drawn to scale unless otherwise stated.

DETAILED DESCRIPTION OF THE INVENTION

The following Detailed Description is merely exemplary in nature and is not intended to limit the present disclosure or the application and uses of the same. The term "exemplary," as appearing throughout this document, is synonymous with the term "example" and is utilized repeatedly below to emphasize that the following description provides only multiple non-limiting examples of the present disclosure and should not be construed to restrict the scope of the present disclosure, as set-out in the Claims, in any respect.

Generally, the present disclosure relates to a cleaning system, such as a cleaning system for cleaning a toilet bowl. The system may generally include a handling tool and a removably attached cleaner block. The cleaner block may be a dissolvable unit, such that it begins dissolving when exposed to liquid (e.g., water in a toilet bowl).

The shape, construction, material characteristics, etc. of the cleaner block may allow it to be scrubbed, scoured, and rubbed against the inner surface of the toilet bowl for cleaning purposes. The cleaner block may dissolve eventually, but slowly enough to maintain sufficient scrubbing, scouring, rubbing, or other cleaning action during use.

The handling tool may include various features for improving ergonomics and other benefits to be discussed. The handling tool may also include a retainer arrangement that removably attaches to the cleaner block. The retainer arrangement may include features for facilitating attachment to the block and detachment from the block. The retainer arrangement may also be configured to robustly engage the cleaner block during use. In addition, the handling tool may further include a sealing member that seals to the cleaning block. This seal may impede liquid intrusion toward the retainer arrangement. Accordingly, liquid within the toilet bowl may be impeded from the retainer arrangement and its attachment to the cleaner block, which improves attachment strength of the handling tool to the cleaner block.

The cleaning system also includes features that improves manufacturing efficiency, produces less waste, and more. For example, the cleaner block may be constructed from dissolvable material, which may be dissolve eventually during and after use, and which may be flushed away safely. Furthermore, the handling tool may include relatively few parts and may be reusable. Additionally, manufacture of the handling tool and the cleaner block may be relatively simple and inexpensive for increased efficiencies.

Referring initially to FIGS. 1-4, a cleaning system 100 is illustrated according to example embodiments. The cleaning system 100 may be configured for manually cleaning, scrubbing, scouring, or otherwise sanitizing a toilet, including areas below the waterline. However, it will be appreciated that the system 100 may be configured for other uses without departing from the scope of the present disclosure.

Figure 2:
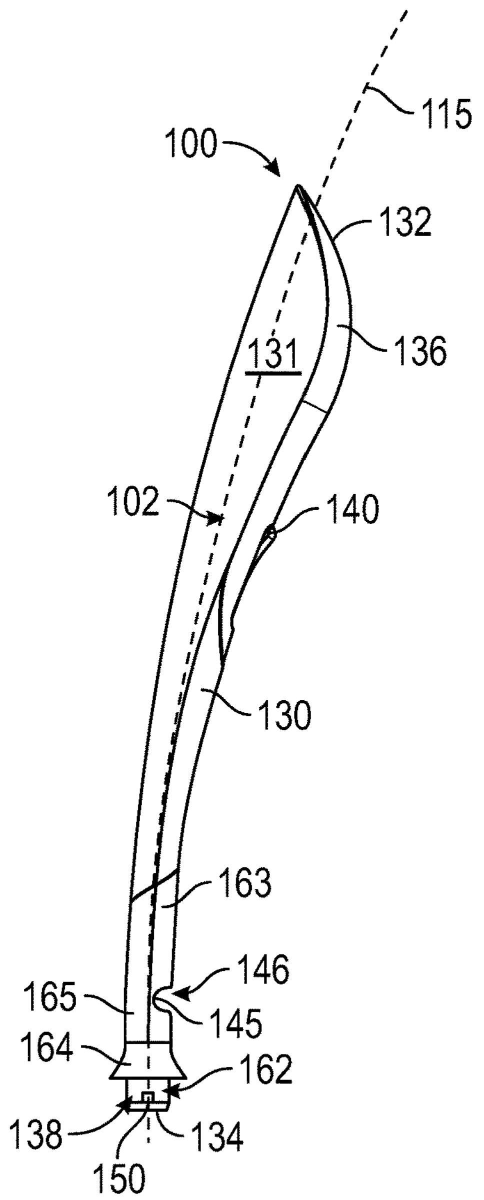
FIG. 2 is a side view of the handling tool of FIG. 1 shown in a second position according to example embodiments of the present disclosure.
Figure 3:
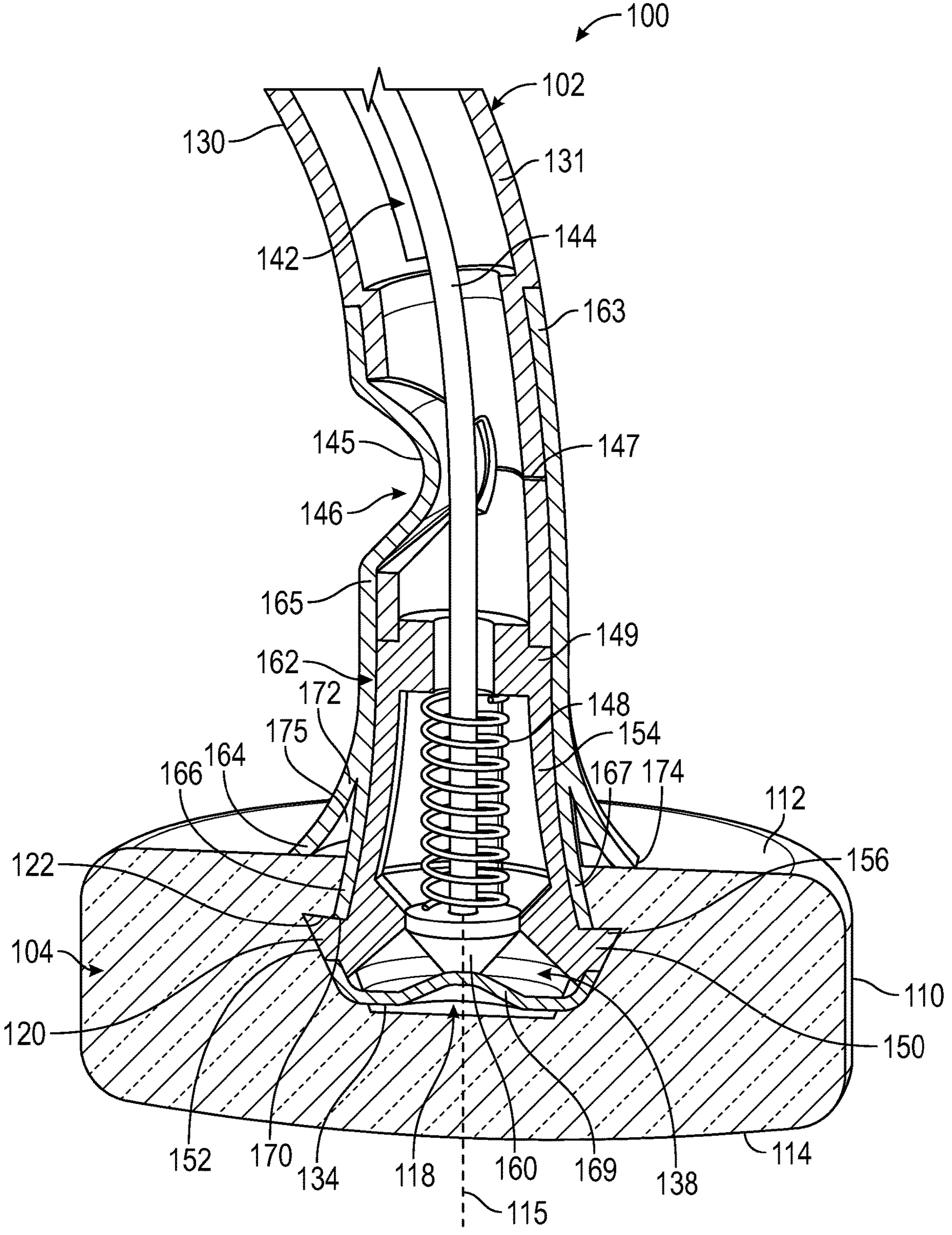
FIG. 3 is a cross-sectional perspective view of an end of the cleaning system, including the handling tool shown in the first position of FIG. 1 and shown with a removably attached cleaning block according to example embodiments of the present disclosure.
Figure 4:
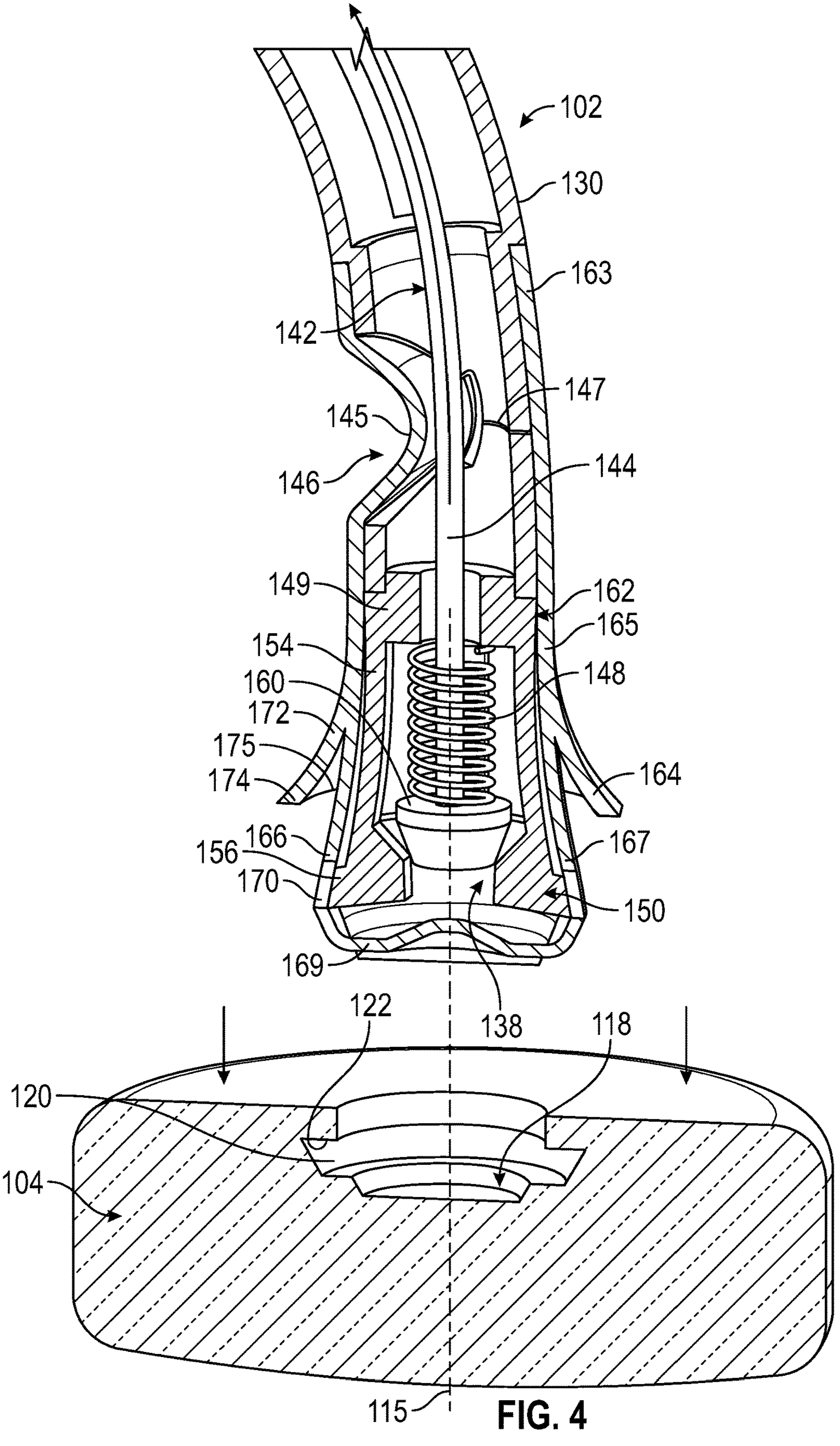
FIG. 4 is a cross-sectional perspective view of the end of the cleaning system of FIG. 3 in the second position of FIG. 2 and shown with the cleaning block detached.

The cleaning system 100 may generally include a handling tool 102 (FIGS. 1-4) and a cleaner block 104 (FIGS. 3 and 4). The handling tool 102 may be removably attached to the cleaner block 104.

The cleaner block 104 (FIG. 2) may have a variety of shapes and constructions. For example, the block 104 may be solid and non-hollow. The block 104 may also be disc-like and puck-shaped in some embodiments. The block 104 may include an outer surface, including a side surface 110, a top surface 112, and a bottom surface 114. The side surface 110 may be rounded (e.g., annular) and may extend in a circumferential direction about an axis 115 (i.e., system axis 115). The bottom surface 114 may be rounded (e.g., circular) and relatively flat and centered on the axis 115. The top surface 112 may be rounded (e.g., circular) with a recess 118. The top surface 112 and the recess 118 may be centered on the axis 115. The recess 118 may be shallow and cup-shaped. Also, the recess 118 may also include at least one cavity 120. For example, as shown in FIGS. 3 and 4, the cavity 120 may be defined by an undercut 122 in the block 104 that extends radially outward from the axis 115 and from the central region of the recess 118. The undercut 122 may extend continuously about the axis 115 to define an annular cavity 120 in some embodiments. In additional embodiments, there may be a plurality of individual undercut cavities 120 that are spaced apart (e.g., spaced apart equally) about the axis 115.

In some embodiments, the material of the block 104 may be dissolvable upon contact with liquid, such as toilet bowl water. This material may include powder or other solid material that has been compacted (e.g., in a mold, press, etc.) to define the shape of the block 104. The material included in the block may include one or more cleaning agents, abrasive agents, perfume or fragrant materials, surfactants, nonionic surfactants, acids, bases, antimicrobial active ingredients, preservatives, chelating agents, polymers, colorants, builders, bleaching agents, corrosion inhibitors, flush regulators, active ingredients to reduce stickiness, and/or enzymes.

The material on the outer surface of the block 104 may begin dissolving, foaming, or otherwise reacting as the block 104 is exposed to liquid. As the block 104 is used and scrubbed against the interior of the toilet bowl, the block 104 may continue to break down and reduce. As will be discussed, the block 104 of the present disclosure may be configured to break down eventually, at a controlled rate, etc. The material used to construct the block 104 may be configured so that it dissolves eventually and at a controlled rate. Furthermore, as will be discussed, the handling tool 102 may include features that protect its removable attachment to the block 104.

Accordingly, the block 104 may be ergonomically attached to the handling tool 102, the block 104 may remain securely attached to the handling tool 102 during use, and then the block 104 may be selectively detached and released from the handling tool 102 when manual scrubbing of the toilet is complete. The block 104 may be released from the handling tool 102 into the toilet bowl water, the block 104 may further dissolve, and the material may be flushed away in some embodiments. The handling tool 102 may be reused later and removably attached to a replacement cleaner block 104. Accordingly, the cleaning system 100 may produce little-to-no solid waste.

It will be appreciated that the cleaning system 100 may be configured differently without departing from the scope of the present disclosure. For example, the cleaning system 100 may be configured for cleaning sinks, drains, bathtubs, showers, or other areas.

Referring now to FIGS. 1 and 2, the handling tool 102 will be discussed in greater detail. The handling tool 102 may include a wand 130. The wand 130 may be elongate and may extend along the axis 115 (i.e., the wand axis or system axis) between a first end 132 and a second end 134. The axis 115 of the wand 130 may be curved and nonlinear. For example, the wand 130 may be curved proximate the second end 134 for improved ergonomics. The wand 130 may include one or more elongate shaft portions 131. The shaft portions 131 may be rigid, thin-walled, and plate-like. The shaft portions 131 may be elongate and contoured parts. The shaft portions 131 may extend longitudinally along the axis 115 and, in some embodiments, may contour about the axis 115. These shaft portions 131 may be constructed from a polymeric or composite material. In some embodiments, there may be a plurality of shaft portions 131 that attach together (e.g., via a snap-fit, via fasteners, etc.) to define a hollow housing for components discussed below.

The handling tool 102 may also include a hand grip 136. The hand grip 136 may be defined at or proximate the first end 132 of the wand 130. The hand grip 136 may be configured for wrap-around grip by the user's hand for holding and manipulating the wand 130. The hand grip 136 may include features for improved gripping. For example, the hand grip 136 may include contoured surfaces, compressible material, or other features that correspond to the hand and fingers. Also, the hand grip 136 may include high-friction material for improved grip.

Additionally, in some embodiments, the wand 130 may include a rotational joint 146. The joint 146 may be a hinge joint disposed proximate the second end 134. The joint 146 may allow rotation and flexure of the second end 134 during use. As shown, the wand 130 may include a concave indent 145 that defines the joint 146. As shown in FIGS. 3 and 4, there may opposing abutment surfaces 147 between adjacent shaft portions 131 of the wand 130. The abutment surfaces 147 may lie substantially within a plane that extends normal to the axis 115. In a neutral, unflexed position of the joint 146, the surfaces 147 may abut. As the joint 146 flexes, the surfaces of the indent 145 may move toward each other, and the surfaces 147 may space apart. The end 134 may be biased toward the neutral, unflexed position. Also, abutment of the surfaces 147 may support the end 134 and also limit flexing movement of the end 134 as it returns to the neutral, unflexed position.

Furthermore, the handling tool 102 may include a retainer arrangement 138. The retainer arrangement 138 may be attached to and supported by the wand 130 proximate the second end 134. The retainer arrangement 138 may be supported for movement relative to the wand 130, for example, when attaching and detaching the cleaner block 104. As will be discussed, the retainer arrangement 138 may move between a retaining position (FIG. 3) and a releasing position (FIG. 4). The retaining position may also be referred to as an engaged position, a projected position, or otherwise, and the releasing position may correspondingly be referred to as a disengaged position, a retracted position, etc. The retainer arrangement 138 may be removably attached to the block 104 when in the retaining position, and the retainer arrangement 138 may be disengaged for releasing the block 104 when in the releasing position. The retainer arrangement 138 may also receive a replacement block 104 when in the releasing position and then the retainer arrangement 138 may move to the retaining position to hold the replacement cleaner block 104.

For example, the retainer arrangement 138 may include at least one engagement member 150 that is supported for movement (e.g. radial movement) for engaging and disengaging the cleaner block 104. In some embodiments, there may be a plurality of engagement members 150 that are spaced equally about the axis 115. Two engagement members 150 spaced on opposite sides of the axis 115 are shown in FIGS. 3 and 4. In some embodiments, there may be three engagement members 150 spaced one hundred twenty degrees (120°) apart. In additional embodiments, there may be four engagement members 150 spaced ninety degrees (90°) apart, or the retainer arrangement 138 may include more.

The engagement members 150 may be wedge-shaped and may be provided at the terminal portion of the second end 134 of the wand 130. The engagement member 150 may be connected to the shaft portions 131 further up the wand 130 via a respective resilient leg 154. The legs 154 may be thin-walled and elongate and resiliently flexible for radial movement. The engagement members 150 may include a toe 156 that projects out radially from the end of the respective leg 154. Also, the engagement members 150 may include an inclined lower edge surface 152. The lower edge surface 152 may be inclined relative to the axis 115. Collectively, the lower edge surfaces 152 may taper and increase in radial width relative to the direction along the axis 115 away from the second end 134.

The retainer arrangement 138 may further include a plug 160. The plug 160 may be frustoconic and inverted with a narrower end at the second end 134 and the wider end further along the axis 115 away from the second end 134. The plug 160 may be centered on the axis 115. The plug 160 may be disposed internally between the inner sides of the engagement members 150. The plug 160 may be supported for movement within the wand 130 and along the axis 115. In at least one position (FIG. 3), the plug 160 may push and abut against the inner sides of the engagement members 150 to thereby bias the engagement members 150 outward radially. In another position (FIG. 4), the plug 160 may be moved away from the engagement members 150, allowing the resilient legs 154 to bias inward radially.

The handling tool 102 may also include a control component 140 supported by the wand 130 (FIGS. 1 and 2). The control component 140 may include a button, switch, dial, lever, button, or other input device for selectively controlling movement of the retainer arrangement 138. As illustrated in FIGS. 1 and 2, the control component 140 may include a trigger switch that is disposed proximate the hand grip 136. The control component 140 may be positioned ergonomically for actuation by the user's forefinger. The control component 140 may be supported for movement along the axis 115 between a first, forward position and a second, rearward position. By moving the control component 140 between these first and second positions, the user may selectively and correspondingly move the retainer arrangement 138 between the retaining position and the releasing position.

The handling tool 102 may further include a linkage system 142. The linkage system 142 may include one or more elongate cords, cables, pulleys, ties, lines, geartrains, or other linkage members that extend along the axis 115 between the first and second ends 132, 134 and that operatively connect/couple the control component 140 to the retainer arrangement 138. In some embodiments, the linkage system 142 may be substantially contained within the shaft portion(s) 131 and supported for movement within the wand 130. For example, as shown in FIGS. 3 and 4, the linkage system 142 may include a line 144. The line 144 may be a cable or other elongate and flexible member. One end of the line 144 may be connected to the control component 140, and the other end may be connected to the plug 160. Furthermore, the linkage system 142 may include a biasing member 148, such as a helical spring as shown. The biasing member 148 may be a leaf spring, a resiliently bendable member, or other type without departing from the scope of the present disclosure. The biasing member 148 may be seated against the plug 160 on one end and against a shaft seat 149. The shaft seat 149 may be annular and the line 144 may pass through the seat 149 (and the biasing member 148) to attach to the plug 160.

In the first position of the control component 140 (e.g., the radially projected position of the trigger shown in FIG. 1), the biasing member 148 may be in tension, thereby pushing the plug 160 toward the second end 134, such that the plug 160 biases the engagement members 150 radially outward. In this retaining position (i.e., projected position, etc.), the engagement members 150 may be received and retained within the one or more undercut cavities 120 of the block 104. The engagement members 150 may remain biased and projected outward such that a removable, interference fit is defined between the toes 156 of the engagement members 150 and the undercut 122 of the block 104.

The user may squeeze the trigger of the control component 140 inward radially (FIGS. 2 and 4), and the linkage system 142 may, in turn, pull the plug 160 away from the second end 134 against the spring force of the biasing member 148, thereby allowing the engagement members 150 to resiliently flex inward radially. The toes 156 may actuate radially inward enough to provide clearance for the block 104 to move along the axis 115 and detach from the wand 130. In some embodiments, the force of gravity may be sufficient for the block 104 to fall away from the wand 130 for ease of detachment.

When the user releases the control component 140, the biasing member 148 may bias the plug 160 back toward the second end 134 such that the engagement members 150 are pushed back outward radially. In some embodiments, to install a replacement block 104, the user may insert the second end 134 into the block 104 while squeezing the control component 140 and then release once the block 104 is attached. The inclined lower edge surfaces 152 of the engagement members 150 may help to guide and center the second end 134 to the recess 118 of the cleaning block 104. Also, in some embodiments, the user may simply press and advance the second end 134 into the recess 118 of the cleaning block 104 without having to squeeze the control component 140. In these embodiments, the pressure of the surface 112 of the cleaning block 104 against the inclined lower edge surfaces 152 may actuate the retainer arrangement 138 and retract the engagement members 150 such that the cleaner block 104 snap-fits thereto easily.

The handling tool 102 may additionally include an end member 162. As shown in FIGS. 3 and 4, the end member 162 may include an attachment portion 165 that is attached to the wand 130 and a sealing member 164 that extends from the attachment portion 165.

In some embodiments, the end member 162 may be a unitary, one-piece part made out of a polymer. In some embodiments, the end member 162 may be a molded (e.g., injection molded) part. In some embodiments, the end member 162 may be formed from a thermoplastic elastomer (TPE). Once formed, the end member 162 may be attached to the wand 130, for example, by pulling the end member 162 onto the wand 130 like a sock. The end member 162 may have material resiliency for compressing onto and frictionally attaching to the wand 130.

The attachment portion 165 may include a shaft portion 163 that wraps around, layers over, and covers the wand 130. In some embodiments, the shaft portion 163 is received in and covers the indent 145 of the joint 146. The attachment portion 165 may also include a boot 166 that covers over the terminal part of the second end 134. The boot 166 may include a side 167 that covers over the resilient legs 154 and that include openings 170 that receive respective ones of the engagement members 150. The boot 166 may also include an end cap 169 that covers over the second end 134 and that provides a seat surface for the plug 160. In some embodiments, the end cap 169 of the boot 166 may be contoured inward along the axis 115 such that the boot 166 may seat against the end cap 169 when the retainer arrangement 138 is in the retaining position represented in FIG. 3.

The sealing member 164 may be a relatively thin sheet or membrane. The sealing member 164 may be resilient and elastic. The sealing member 164 may be skirt-shaped. The sealing member 164 may include an upper, inner end 172 that encircles and attaches to the attachment portion 165, longitudinally between the shaft portion 163 and the boot 166. The sealing member 164 may also include a lower, outer edge 174 that is disposed outward radially compared to the inner end 172. The sealing member 164 may flare outward gradually and may slightly contour from the inner end 172 to the outer edge 174. Also, a conic space 175 may be defined between the boot 166 and the inner surface of the sealing member 164. Accordingly, the sealing member 164 may be spaced apart at a distance from the boot 166 and from the retainer arrangement 138.

As shown in FIG. 3, the sealing member 164 may lie against and abut the cleaner block 104. As such, the sealing member 164 may form a liquid barrier and seal against the dissolvable cleaner block 104. The sealing member 164 may push against and resiliently flex against the block 104. The outer edge 174 may resiliently flex, fold, ripple, or otherwise deform to conform against the surface 112 to conform to the block 104 and improve the seal. While the liquid barrier may not necessarily be water-tight, the sealing member 164 may seal against the surface 112 to impede liquid intrusion toward the retainer arrangement 138. In other words, during use in the toilet bowl, the sealing member 164 may impede the water from reaching the retainer arrangement 138 and its direct attachment to the cleaner block.

Accordingly, the sealing member 164 may delay dissolving action that may otherwise at the retainer arrangement 138. Thus, even though the wand 130 is directly attached to the cleaner block 104 (without a disposable interface), the attachment may be robust enough to withstand the toilet cleaning process. Furthermore, very little if any waste is generated. The block 104 may dissolve away and may be flushed, and the wand 130 may be reused.

Additionally, the boot 166 may abut against the block 104 and provide useful characteristics for interfacing with the material of the block 104. For example, the boot 166 may be resiliently compressible such that it presses outward onto the block 104 for further retaining strength. Also, the boot 166 may have a surface roughness, an adhesion characteristic, or other material characteristic for bonding, frictionally engaging, or otherwise interfacing with the cleaner block 104.

Referring now to FIGS. 5-8, the handling tool 202 of the cleaning system is illustrated according to additional embodiments of the present disclosure. The handling tool 202 may include components that correspond to those discussed above with respect to the embodiments of FIGS. 1-4. Corresponding components are indicated with corresponding reference numbers increased by 100.

Figure 5:
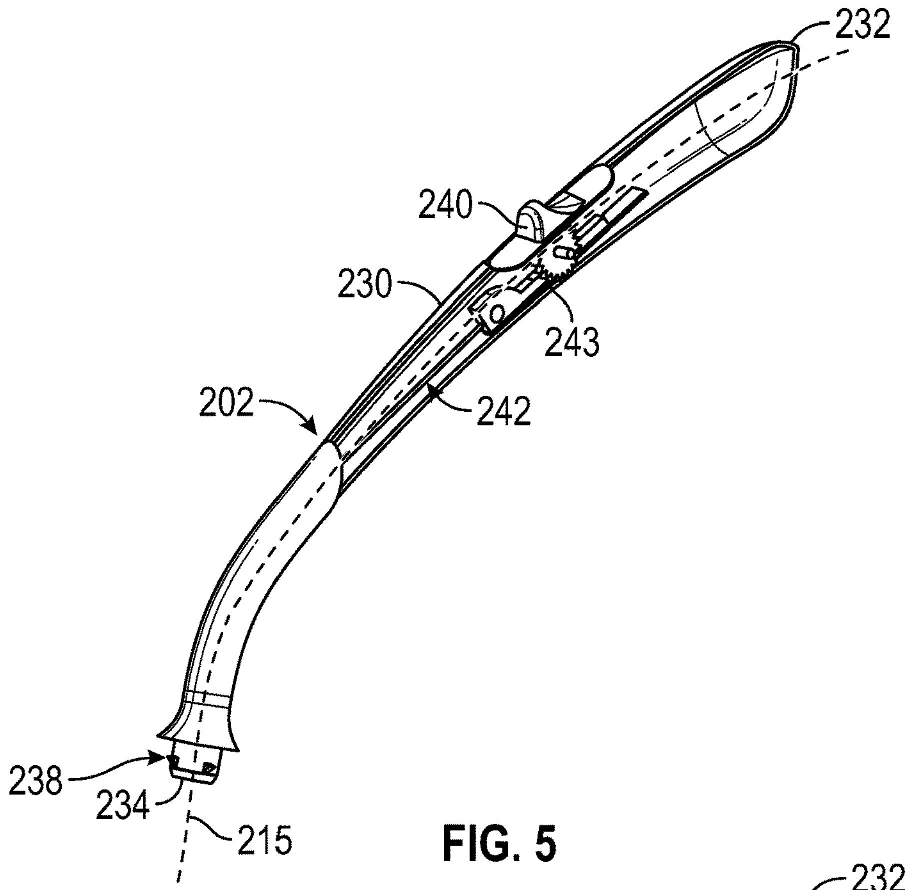
FIG. 5 is a perspective and partly cross-sectional view of the handling tool of the cleaning system according to additional embodiments of the present disclosure, wherein the handling tool is shown in the first position.
Figure 6:
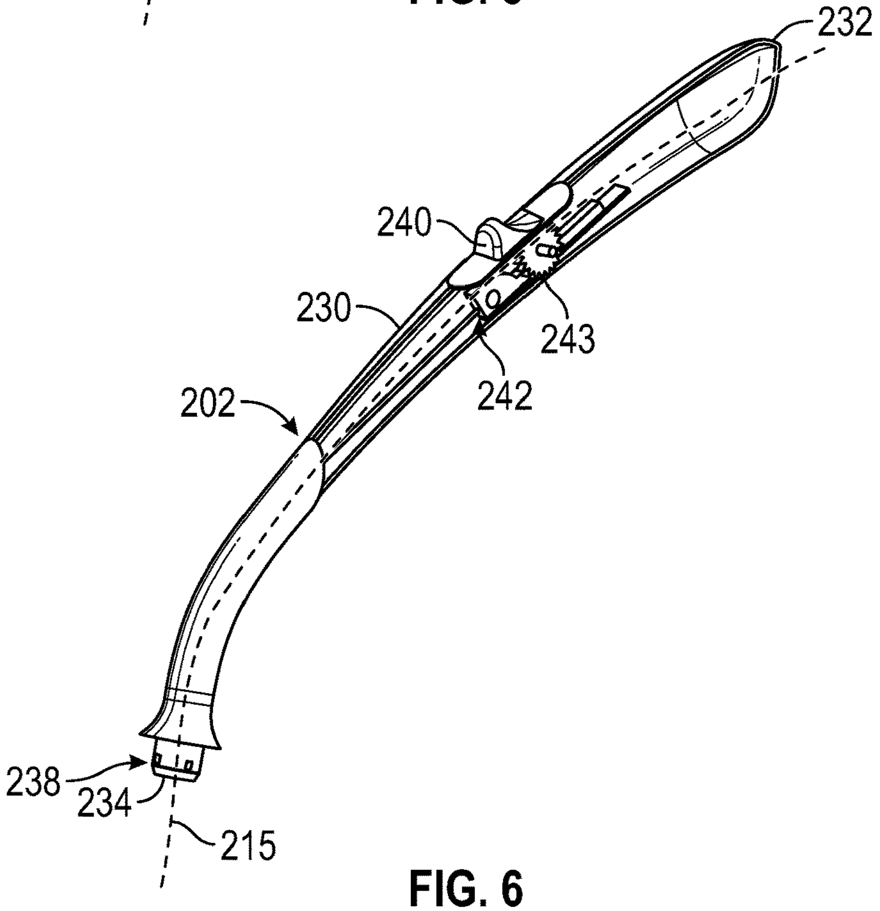
FIG. 6 is a perspective and partly cross-sectional view of the handling tool of FIG. 5, wherein the handling tool is shown in the second position.

As shown in FIGS. 5 and 6, the control component 240 may be a slider switch. The control component 240 may be supported for sliding longitudinal movement along the wand 230. Portions of the wand 230 are hidden in FIGS. 5 and 6 to reveal the linkage system 242. As shown, the linkage system 242 may include a geartrain 243. The geartrain 243 may mechanically transmit the user's input from the control component 240 to the retainer arrangement 238. The geartrain 243 may also provide mechanical advantage when using the control component 240. In some embodiments, the geartrain 243 may be a rack and pinion gear train 243 or other type. As shown in FIG. 5, the control component 240 may have a first position (e.g., closer to the first end 232), which selectively positions the retainer arrangement 238 in the retaining position. Also, as shown in FIG. 6, the control component 240 may have a second position (e.g., closer to the second end 234), which selectively positions the retainer arrangement 238 in the releasing position.

Figure 7:
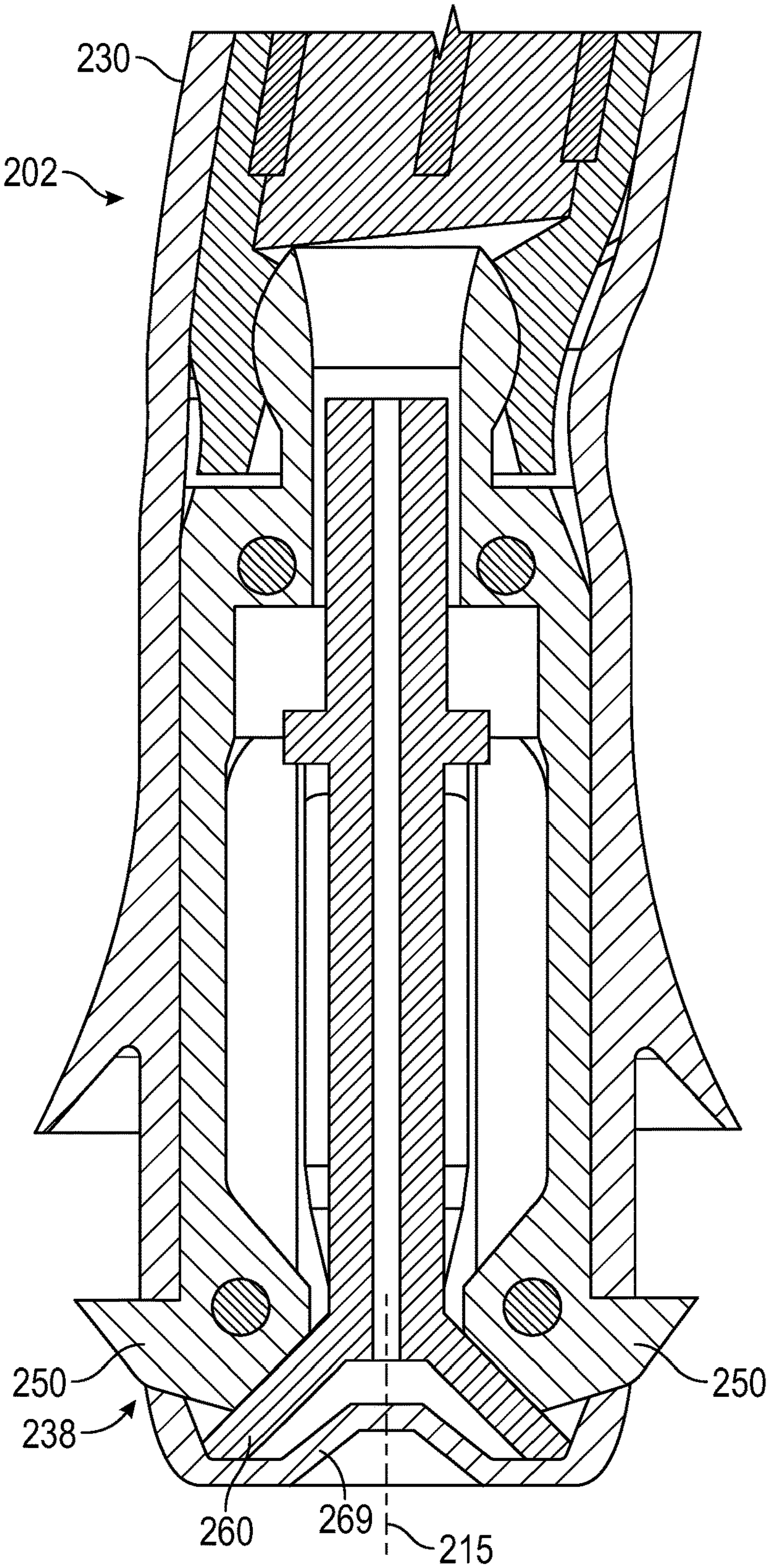
FIG. 7 is a cross-sectional view of the end of the handling tool of FIG. 5 shown in the first position.
Figure 8:
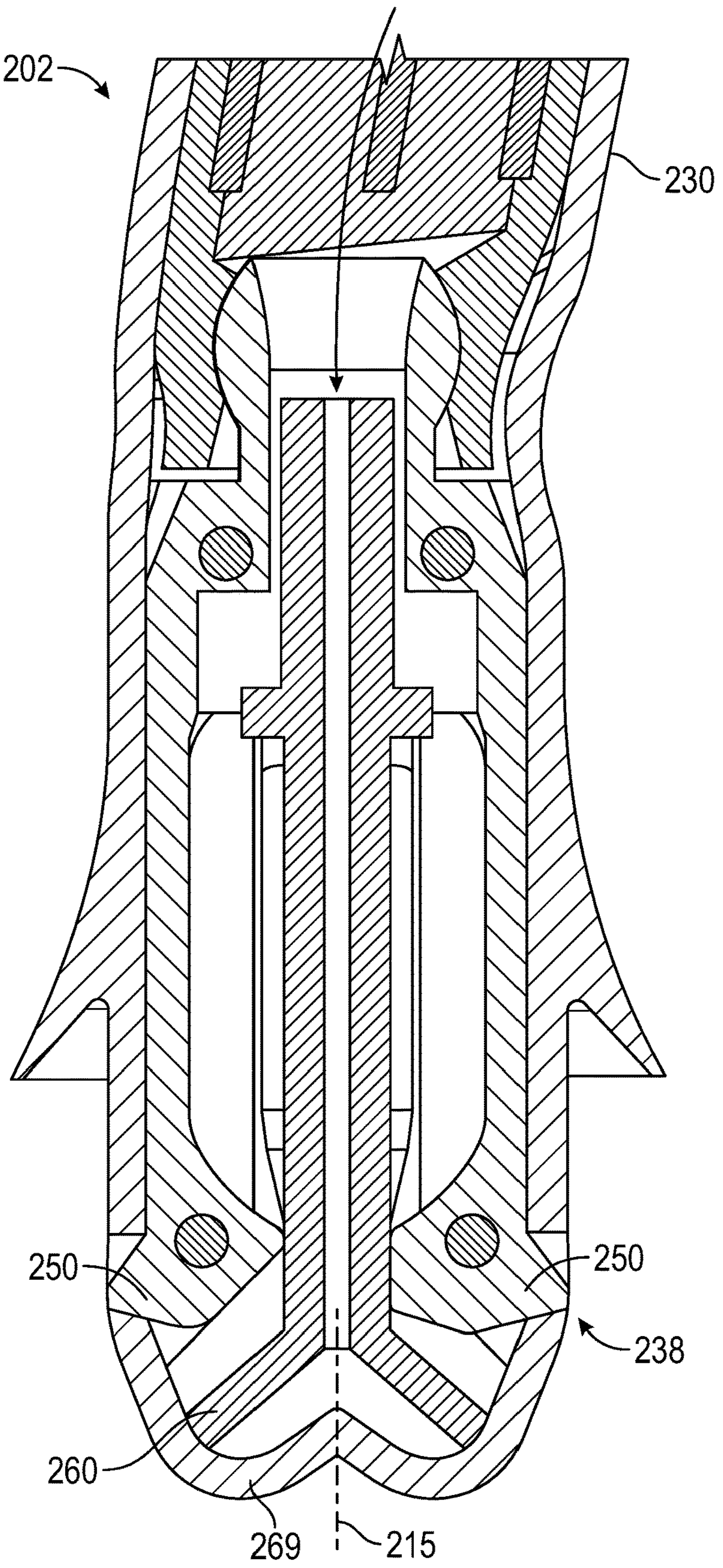
FIG. 8 is a cross-sectional view of the end of the handling tool of FIG. 6 shown in the second position.

More specifically, as shown in FIG. 7, when the control component 240 is positioned toward the first end 232 (FIG. 5), the linkage system 242 may pull the plug 260 generally toward the first end 232 along the axis 215. Accordingly, the plug 260 may push and abut against the inner sides of the engagement members 250 to thereby bias the engagement members 250 outward radially. In contrast, when the user slides the control component 240 forward along the axis 215 (FIG. 6), the plug 260 may be moved along the axis 215, allowing the resilient legs 154 to bias inward radially. In some embodiments, the end cap 269 may be resilient and may bias the plug 260 back toward its neutral position, biasing the engagement members 250 outward radially. In some embodiments, the retainer arrangement 238 may be biased toward the retaining position of FIG. 7, or in other embodiments, the control component 240 may be manually positioned to return the retainer arrangement 238 to the retaining position.

While the foregoing description focuses primarily on articles of manufacture, namely, cleaning systems including handling tools and corresponding cleaner blocks, there has also been disclosed methods for manufacturing these articles. Manufacture of the parts, assembly of the parts, etc. can be accomplished efficiently.

Terms such as "first" and "second" have been utilized above to describe similar features or characteristics in view of the order of introduction during the course of description. In other sections of this Application, such terms can be varied, as appropriate, to reflect a different order of introduction. While at least one exemplary embodiment has been presented in the foregoing Detailed Description, it should be appreciated that a vast number of variations exist. It should also be appreciated that the exemplary embodiment or exemplary embodiments are only examples, and are not intended to limit the scope, applicability, or configuration of the invention in any way. Rather, the foregoing Detailed Description will provide those skilled in the art with a convenient road map for implementing an exemplary embodiment of the invention. It is understood that various changes may be made in the function and arrangement of elements described in an exemplary embodiment without departing from the scope of the invention as set forth in the appended claims.

What is claimed is:

1. A handling tool for a dissolvable cleaner block, the handling tool comprising:

a wand extending from a first end to a second end;

a retainer attached to the second end of the wand, the retainer being moveable between a retaining position and a releasing position, the retainer being configured to removably attach the wand to the dissolvable cleaner block when in the retaining position, the retainer being configured to release the dissolvable cleaner block from the wand when in the releasing position, and the retainer including at least one engagement member that removably engages the dissolvable cleaner block when the retainer is in the retaining position; and a seal attached to the wand adjacent the retainer, a portion of the seal flaring radially outward from the second end of the wand, and the flared portion of the seal being configured to contact and seal against an outer surface of the dissolvable cleaner block when the dissolvable cleaner block is removably attached to the wand to impede liquid intrusion toward the retainer within the dissolvable cleaner block.

2. The handling tool of claim 1, further comprising an end member having an attachment portion attached to the second end of the wand, wherein the retainer is attached to the end member, and wherein the seal is attached to the attachment portion.

3. The handling tool of claim 2, wherein the attachment portion covers over the second end of the wand and includes at least one opening that receives the at least one engagement member.

4. The handling tool of claim 3, wherein:

the attachment portion includes a boot having a side and an end cap that cover over the second end of the wand, the side includes the at least one opening.

5. The handling tool of claim 2, wherein the flared portion of the seal flares radially outward from the attachment portion and from the retainer.

6. The handling tool of claim 1, wherein the flared portion of the seal is elastically resilient to conform to the outer surface of the dissolvable cleaner block.

7. The handling tool of claim 1, further comprising a controller supported by the wand, the controller being spaced from the retainer, arrangement, and the controller being configured to manually and selectively cause the retainer to move between the retaining position and the releasing position.

8. The handling tool of claim 7, wherein the retainer is biased toward the retaining position, and wherein the controller is configured to manually and selectively cause the retainer to move to the releasing position.

9. The handling tool of claim 7, further comprising a linkage system that extends along the wand and that operatively connects the controller and the retainer such that manual movement of the controller causes the retainer to move between the retaining position and the releasing position.

10. The handling tool of claim 9, wherein:

the at least one engagement member radially withdraws as the retainer moves between the retaining position and the releasing position, the retainer further includes a plug that is axially moveable as the retainer moves between the retaining position and the releasing position, the plug biasing the engagement member radially outward when the retainer is in the retaining position, and the linkage system operatively connects the controller and the plug such that manual movement of the controller causes actuation of the plug to allow at least one the engagement member radially withdraw toward the releasing position.

11. The handling tool of claim 10, wherein the linkage system includes a biasing member that biases the plug against the at least one engagement member to retain the retainer in the retaining position.

12. The handling tool of claim 10, wherein, when the controller is in a first position, the linkage system pulls the plug toward the controller to thereby bias the plug against the engagement member to retain the retainer in the retaining position; and wherein, when the controller is in a second position, the linkage system releases the plug to release the engagement member to move the retainer to the releasing position.

13. The handling tool of claim 1, wherein the wand extends along a wand axis, and wherein the at least one engagement member includes a plurality of engagement members that are spaced along the wand axis.

14. The handling tool of claim 1, wherein the retainer defines an attachment axis along which the wand is directed to removably attach to the dissolvable cleaner block; and wherein the at least one engagement member includes a surface that is inclined relative to the attachment axis.

15. A cleaning system comprising:

a cleaner block that includes an engagement portion, the cleaner block being dissolvable; and a handling tool that removably attaches to the cleaner block, the handling tool comprising:

a wand extending from a first end to a second end;

a retainer attached to the second end of the wand, the retainer being moveable between a retaining position and a releasing position, the retainer being configured to removably attach the wand to the engagement portion of the cleaner block when in the retaining position, the retainer being configured to release the cleaner block from the wand when in the releasing position, and the retainer including at least one engagement member that removably engages the engagement portion of the cleaner block when the retainer is in the retaining position; and a seal attached to the wand adjacent the retainer, a portion of the seal flaring radially outward from the second end of the wand, and the flared portion of the seal being configured to contact and seal against an outer surface of the cleaner block when the cleaner block is removably attached to the wand to impede liquid intrusion toward the retainer within the cleaner block.

16. The cleaning system of claim 15, wherein the outer surface of the cleaning block defines a recess, and wherein the engagement portion of the cleaner block is included in the recess.

17. The cleaning system of claim 16, wherein the cleaner block includes an undercut cavity that extends from the recess, the undercut cavity receiving the at least one engagement member when the retainer is in the retaining position.

18. A method of manufacturing a cleaning system, the method comprising:

attaching a retainer to a wand, the retainer being moveable between a retaining position and a releasing position, the retainer being configured to removably attach the wand to a dissolvable cleaner block when in the retaining position, the retainer being configured to release the dissolvable cleaner block from the wand when in the releasing position, and the retainer including at least one engagement member that removably engages the dissolvable cleaner block when the retainer is in the retaining position; and attaching a seal to the wand adjacent the retainer, a portion of the seal flaring radially outward from the wand, and the flared portion of the seal being configured to contact and seal against an outer surface of the dissolvable cleaner block when the dissolvable cleaner block is removably attached to the wand to impede liquid intrusion toward the retainer within the dissolvable cleaner block.

19. The method of claim 18, further comprising forming the dissolvable cleaner block.

20. The method of claim 18, further comprising providing an end member having an attachment portion and the seal, wherein attaching the seal includes sliding the attachment portion onto an end of the wand.

* * * * *